United States Patent Office 3,374,638
Patented Mar. 26, 1968

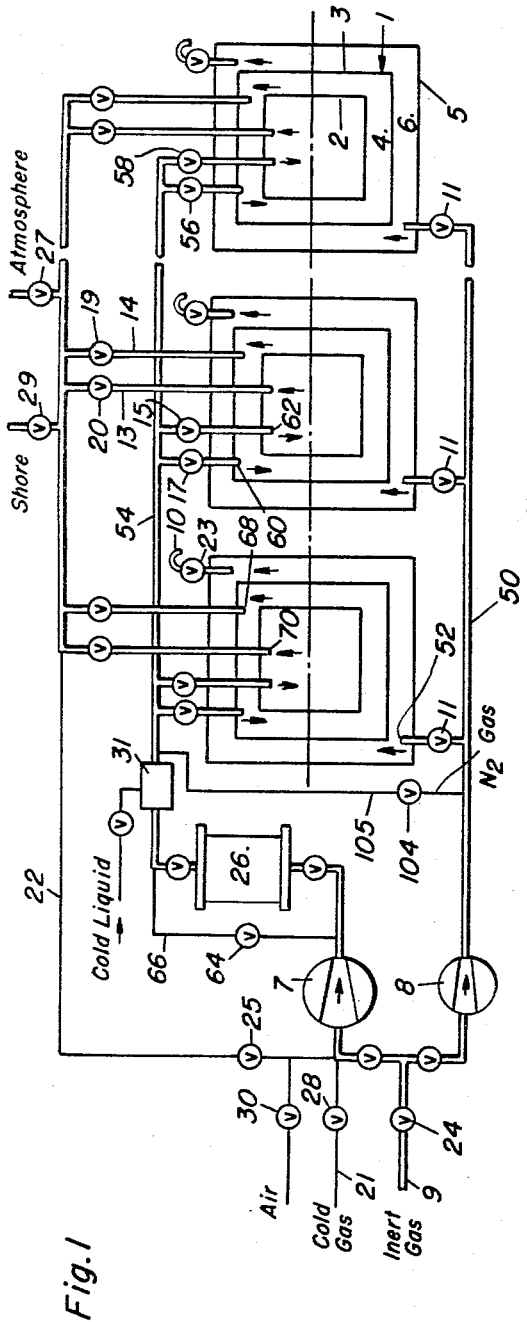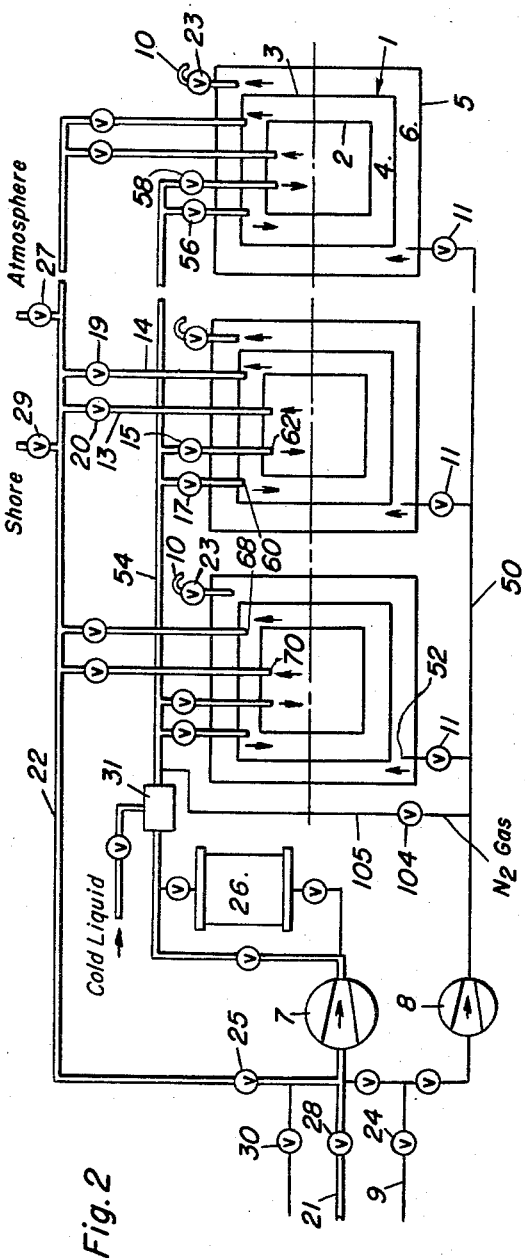
March 26, 1968
N. K. BASILE ET AL  3,374,638
SYSTEM FOR COOLING, PURGING AND WARMING LIQUEFIED GAS
STORAGE TANKS AND FOR CONTROLLING THE
BOIL-OFF RATE OF CARGO THEREIN
Filed April 19, 1966
3 Sheets-Sheet 1
INVENTORS
Norman K. Basile
& Donald R. Yearwood
BY
Stevens, Davis, Miller + Mosher
ATTORNEYS

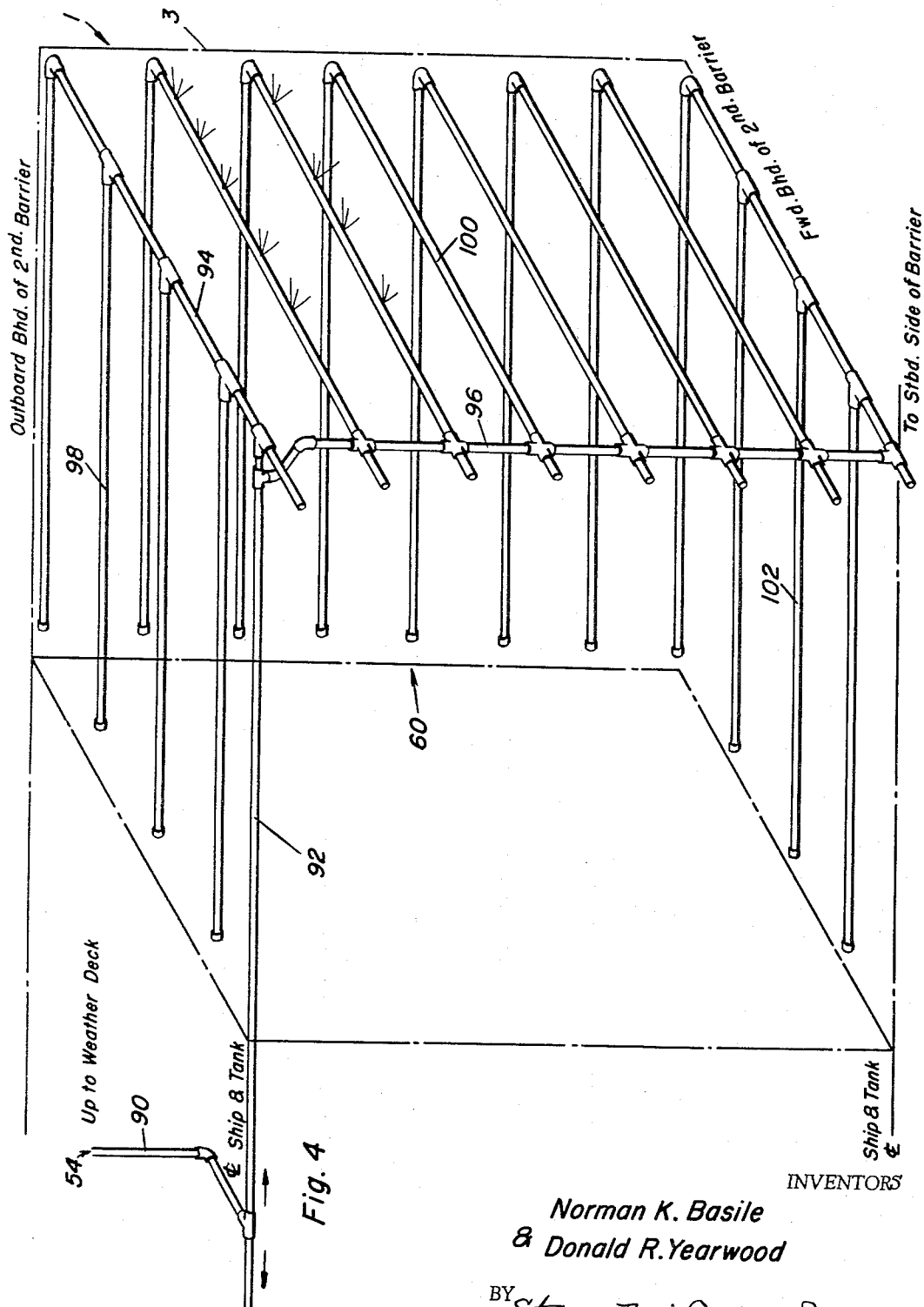

3,374,638
SYSTEM FOR COOLING, PURGING AND WARMING LIQUEFIED GAS STORAGE TANKS AND FOR CONTROLLING THE BOIL-OFF RATE OF CARGO THEREIN
Norman K. Basile, Bronx, and Donald R. Yearwood, Brooklyn, N.Y., assignors to John J. McMullen, Montclair, N.J.
Filed Apr. 19, 1966, Ser. No. 543,602
14 Claims. (Cl. 62—45)

ABSTRACT OF THE DISCLOSURE

A liquefied gas storage tank system including inner and outer tanks and a spaced supporting structure and a supply header and distribution piping system for uniformly introducing inert purified flue gas or heated or cooled cargo gas for warming or cooling the tank walls, and a return header system arranged in the void space, outer tank space and inner tank to remove and bleed displaced gas therefrom or recirculate the same through heating or cooling means back to those spaces. The system warms and cools the tanks by effecting novel methods without over-stressing the tank structure and controls the boil-off rate within the inner tank by circulating warmed cargo gas within the outer tank space or returning warmed cargo gas back to the inner tank.

---

The present invention relates to liquefied gas storage tanks and more particularly to a system for purging, cooling, and warming these tanks and for controlling the boil-off rate for the liquid stored therein. Although the present invention can be used with ground based tanks, it has particular utility on liquefied gas transport vessels.

It is known that tanks of the type described, especially those on tankers, must be inspected periodically and repaired if necessary. To accomplish this, the cargo is removed and the tank temperature is raised to a safe level. Only after the tank and space around the tank are flushed with a life-sustaining atmosphere can the inspection and work be performed. Following maintenance, the tank must be inerted and uniformly cooled so that the cooled liquefied cargo can be introduced without overstressing the tank by causing excessively rapid contraction.

It will be appreciated that the cool-down, warm-up, and purging times should be kept as short as possible because the tank remains economically unproductive during these periods. One system for doing this is disclosed in the copending patent application entitled, System for Cooling, Transporting and Warming Up Double Barrier Liquefied Gas Cargo Tanks, by Ulbricht et al., Ser. No. 529,135, filed Feb. 21, 1966, now Patent No. 3,352,123, wherein the tank is cooled by spraying liquefied cargo directly on the walls of the tank. However, pumping the liquefied cargo through piping systems and nozzles so that the tank walls are evenly sprayed may be difficult from an engineering standpoint. It is therefore a principal purpose of the present invention to provide a new and improved system for cooling tanks of the type described by spraying cold fluid directly on the walls of the tank.

It is another object of the present invention to provide a system which warms the tanks after the cargo is removed by circulating the gases within the outer tank space and inner tank space through a compressor which heats the same and back through the nozzle distribution system wherein the heated gas is sprayed directly on the walls of the tank to warm the same.

It is still another object of the present invention to provide a system for cooling tanks of the type described which sprays cold methane gas directly on the walls of the tank to cool the same and after the inner and outer tanks are filled with methane gas, circulates the same through a desuperheater wherein liquid methane is introduced directly into the circulating gas to further cool the same and the tanks.

It is yet another object of the present invention to provide a system for controlling the boil-off rate of the liquid cargo within the tank by circulating the gas within the outer tank through the compressor to heat the same and return the heated gas back to the outer tank in order to increase boil-off. The system can alternately function to collect a part of the boil-off and deliver the same to the compressor wherein it is heated and return the heated gas to the inner tank, thus further increasing boil-off. The remainder of the boil-off can be fed to the boiler and generators or otherwise used as fuel.

Other and further objects of the present invention will become apparent with the following detailed description thereof when taken in view of the appended drawings in which:

FIGURES 1 and 2 are diagrammatic illustrations of the system of the present invention.

FIGURE 4 is a diagrammatic perspective view illustrating the delivery piping system within the outer tank.

Figure 3:
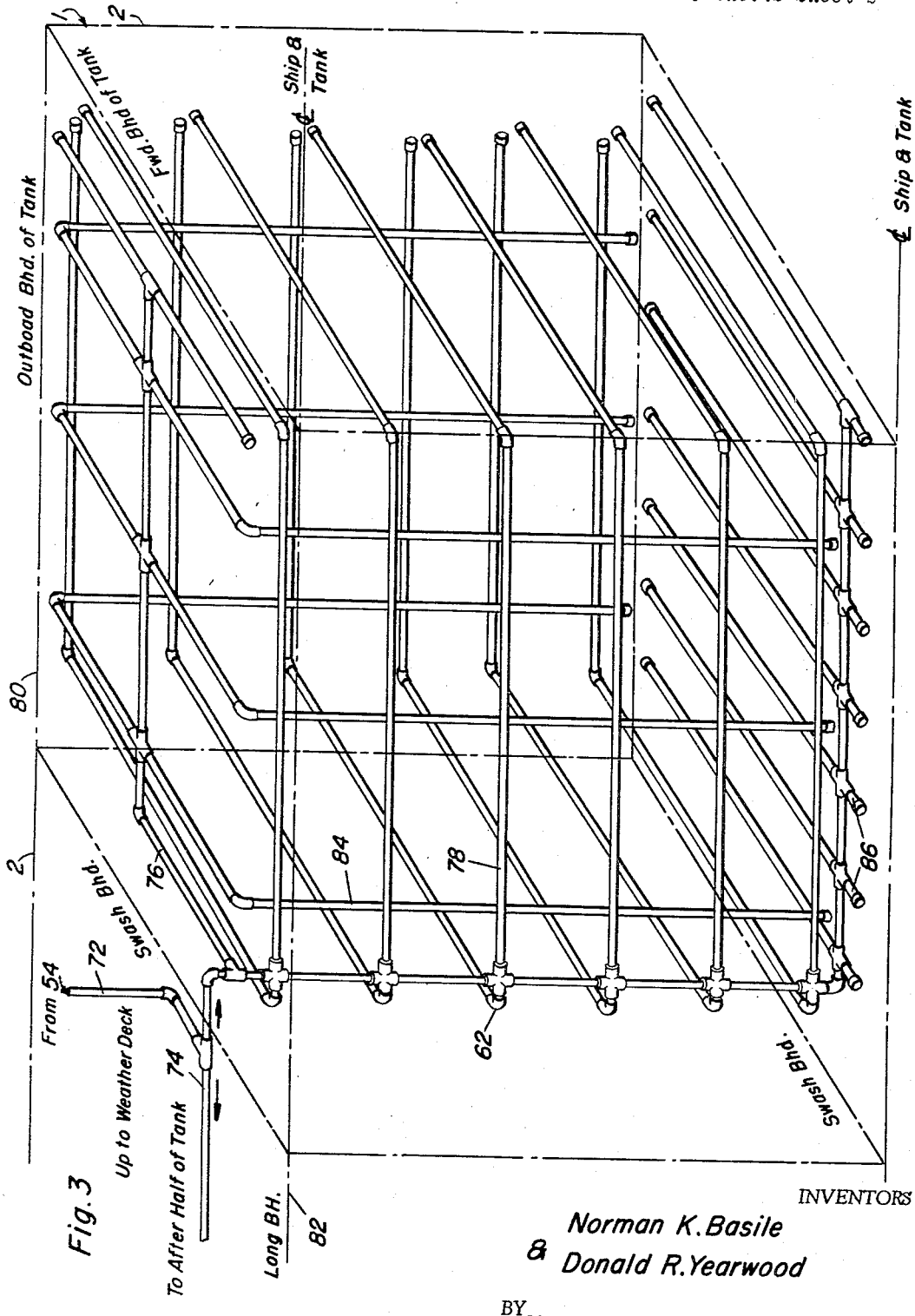
FIGURE 3 is a diagrammatic perspective illustrating the delivery piping system within one subcompartment of the tank.

The herein disclosed example of the present invention is a system used on liquefied gas tankers such as that disclosed in U.S. patent application entitled Apparatus for Cooling and Filling Liquefied Gas Transport and Storage Tanks and Improvements in Said Tanks, Ser. No. 440,081, dated Mar. 16, 1965.

With reference to the drawings in detail, each of a plurality, in this case four, of liquefied storage tanks 1 has an inner tank 2 and a spaced outer tank 3. Each tank 1 is a unitary self-supporting structure and is supported within the ship by any suitable means such as insulated pillars or the like. In order to protect the mild steel ship structure from the cryogenic conditions within the tank, the ship structure 5 is spaced from the outer tank wall 3 to define a void space 6 around tank 1. Further, the outer tank wall or inside surfaces of the ship structure 5 are normally provided with sheets of insulation.

The system includes a pair of blowers or compressors 7 and 8; blower 8 feeds a supply line 50 which communicates through valves 11 to a supply distribution system 52 within the void space 6. System 52 is similar to that shown in FIGURE 2 of the above first-mentioned copending patent application. A second blower 7 is provided which feeds heat exchanger 26 which in turn supplies a desuperheater 31. The output of desuperheater 31 enters the delivery line 54 which feeds through valves 56 and 58 to distributed piping systems 60 and 62 within the outer tank and inner tank, respectively. A bypass valve 64 controls the flow through line 66 which bypasses the heat exchanger 26.

Return lines 68 and 70 are provided within the outer and inner tanks, respectively, and feed through control valves 19 and 20 to a header 22 which communicates with a shore connection (not shown) through valve 29 and the atmosphere through valve 27. Vent 10 communicates with the void space 6 and can be closed off by operation of the control valve 23. Header 15 is led back through control valve 25 to the inputs of blowers 7 and 8. Also feeding the inputs of blowers 7 and 8 is a source of inert gas through valve 24, a source of cold fluid through line 21 and valve 28 and a source of life-sustaining gas, such as air, through valve 30.

The inert gas may be flue gas from the boilers or any other source as well as exhaust from any sort of inert gas generator. It is preferred but not absolutely necessary to use gas with low carbon dioxide content in order to prevent precipitation. Thus, any of the clear burning gases such as butane gas or the like may be used.

The source of cold fluid may be cold cargo gas of the type to be stored within the inner tanks or alternately it could comprise a source of cold inert gas such as cold nitrogen gas or the like.

Before describing the operation of the system, reference is made to FIGURES 3 and 4 wherein the piping systems 60 and 62 are diagrammatically illustrated.

It should be understood that FIGURES 3 and 4 illustrate only one quarter (subcompartment) of each tank 1, but that the same systems and structure are provided for the other subcompartments of the tank. Supply line 54 delivers through line 72 into a pair of fore and aft headers 74 which run down and across the bottom of the tank. Another branch 76 of header 74 runs horizontally and across the subcompartment near the top of the tank. A plurality of pipes 78, spaced vertically from each other are coupled into headers 74 and run horizontally along the swash bulkheads 80, the longitudinal bulkhead 82 and the outer and forward walls 2 of the tank. A second plurality of pipes 84 spaced longitudinally from each other are coupled into the header branch 76 and run upward, across and down near the bulkheads and walls of the tank. A third plurality of pipes 86 spaced longitudinally from each other are coupled to the lower branch of header 74 and extend in the transverse direction near the bottom of tank 2. Pipes 78, 84 and 86 are provided with spray nozzles directed toward the adjacent wall or bulkhead so that the fluid exhausting therefrom is sprayed directly thereon. In order to provide an even spray from all nozzles, the dimension of the sets of pipes decreases for the sets further removed from the inlet of pipe 72.

A similar system is provided for the distribution system 60 (FIGURE 4) which includes a delivery line 90 receiving fluid from line 54 and coupled to a fore and aft header system 92 with an upper branch 94 and a vertical branch 96. Horizontal pipes 98 extend across the tank subcompartment near the top thereof and couple into branch 94. Additional pipes 100 are spaced vertically from each other and are coupled to vertical header 96 and extend horizontally near the forward and outer walls 3 of tank 1. An additional set of pipes 102 is provided near the bottom of outer tank 3. Pipes 98, 100 and 102 are provided with nozzles directed toward the adjacent wall of tank 3. The pipe dimension for the sets decreases according to the fluid distance from pipe 90.

After building and inspection and/or repair, the tank 1 and the ship's structure 5 are at ambient temperature. Prior to loading a low temperature or cryogenic cargo it is necessary to cool the tank 1 down to avoid deleterious thermal transients and shock. In the case of liquid methane, the tank would be cooled to approximately −160° C. When a combination of the vapor from the cryogenic or low temperature liquid cargo and air will result in an explosive or flammable mixture, it may also be necessary to purge the tanks 1, outer tank space 4 and inert space 6 of air prior to loading.

FIGURE 1 shows a diagram of the purging or air freeing operation. In order to purge the tanks 1 outer tank space 4 and void space 6 of air, the blowers or compressors 7 and 8 take suction from an inert gas source 9. This source may be located aboard the vessel, to permit inerting while at sea, or may be located ashore. The inert gas may be flue gas from the ship's boilers, or exhaust from other fuel burning equipment, or some commercially available inert gas such as nitrogen. The blower 8 discharges the inert gas to the void space 6 which is fitted with a gas distribution and return system, FIGURE 3, thereby displacing the air which is relieved via the vent 10 to the atmosphere. The blower 7 will discharge the inert gas to the outer tank space 4 and inner tank 2, thereby displacing air which is relieved via lines 13 and 14 and valve 27 to the atmosphere. The inert gas is distributed in the outer tank space and inner tank 2 by the cool-down piping systems shown in FIGURES 3 and 4. The blower 7 may be used to supply inert gas or air to the void space 6; however, in this example, blower 8 is used to minimize the possibility of an operator inadvertently supplying methane gas to this space. The heat exchanger 26 may be used to remove the heat of compression from the gas. After all air is purged from the void space 6 and the blower 8 is secured, valves 11 and 23 are closed thus trapping inert gas in the void space 6. After all air is purged from the tank 2 and the outer tank space 4 valves 19, 20 and 24 are secured. While, in this purging operation the gas flow is parallel, a series or series/parallel flow can be used.

FIGURE 2 shows a diagram of the cool-down operation. After inerting, in order to cool-down the tanks by one method, cold methane gas is circulated through the inner tanks 2 and outer tank space 4 by the blower 7 discharging to the cool-down system piping shown in FIGURES 3 and 4. The cold methane gas is emitted evenly and directly on the adjacent walls 2 and 3. The source of this gas may be a filled or partially filled cargo tank, a special shipboard liquid tank and evaporation system or a shore connection. Initially, cold methane gas (−160° C.) will be heated by being compressed by the the compressor 7 and then supplied to the tank and the outer tank space 4. The methane gas, from the compressor which is at a temperature about 80° C. above the tank temperature due to the addition of the heat of compression, will displace the inert gas in the tank 2. The inert gas and methane gas mixture is discharged either to the atmosphere via lines 13 and 14 and valve 27 or ashore by opening valve 29. After the tank 2 is freed of all inert gas valves 27 and 28 may be closed and the methane gas recirculated through the tanks by the blower. This gas is gradually cooled by the addition of methane liquid through the desuperheater 31. The liquid vaporizes and thus cools the gas. Alternately, the heat exchanger may be used to cool the recirculated gas. This process is continued until the tanks 2 and outer tank space 4 are sufficiently cool to permit safe loading of cargo. In lieu of recirculating the methane gas used for cooling this gas may be discharged to the atmosphere by opening valves 27 or may be discharged ashore by opening valve 29. In both of these cases, i.e., discharge to the atmosphere or discharge ashore, make-up is supplied from the gas source through line 21.

The capacity required in the blower 7 may be split among two or more blowers, the additional blowers not being shown. This blower (or these blowers) may be used to supply methane vapor to the ship's power plant (not shown); the vapor to be used as a fuel.

In the event the tanks are to be inspected or worked on it is generally necessary to bring them up to an ambient temperature and introduce a life-sustaining atmosphere, air, into various spaces. In this case, all liquid cargo is removed from the tank by a conventional cargo handling system (not shown). The methane vapor will be withdrawn from the tanks 2 and outer tank space 4 via lines 13 and 14 to header 22 by blower 7 and recirculated to the tanks 2 and outer tank space 4. The gas is thereby heated by the compressor. The temperature differential of the incoming gas to the compressor 7 and the outgoing gas is approximately 80° C. This closed circuit action continues until all tanks have been raised to a predetermined temperature such as −30° C. Next, inner tank 2 and tank space 4 are inerted by feeding relatively cool (0° C. to 50° C.) inert gas through blower 7 to the tank spaces. The mixture of inert gas and methane gas is discharged ashore or to the atmosphere until only inert gas is present within these tanks. At this time, the air inlet valve 30 is opened and the inert gas supply valve 9 is closed and the tank spaces are flushed with air through systems 60 and 62 until all inert gas is removed. If inspection or maintenance work is to be carried out in the void space 6, air may be flushed throughout these spaces 6 by blower 8 after the spaces 2 and 4 have been heated up and inerted.

Another method for purging and cool-down, according to the present invention, comprises supplying relatively warm nitrogen gas through line 21, compressor 7 to headers 54 and 50. Compressor 8 is unnecessary and may be eliminated. With the system in this condition the inner tank 2, outer tank space 4 and void space 6 are inerted and filled with nitrogen gas. As the nitrogen gas is introduced within these spaces the air is displaced through vent 10 and valve 27 in the manner described above. Valves 11, 23, 27 and 104 are closed to lock the nitrogen gas within these spaces.

For cool-down, valve 29 is opened and 28 closed so that the nitrogen gas in inner tank 2 and outer tank space 4 is circulated through line 22, compressor 7, line 66 through the desuperheater wherein liquefied nitrogen is fed to the circulating gas stream to cool the same. When the cold nitrogen gas reenters the inner and outer tank spaces through piping systems 60 and 62, it is sprayed directly on the walls 2 and 3 of the tank to rapidly and evenly cool the same.

After the tank reaches a predetermined low temperature, the liquid cargo is delivered to inner tank 2 by means not shown and the gas therein is displaced up through valves 27 and 29 to the atmosphere or shore.

If desired, the system of the present invention can cool the inner walls of tank 2 by introducing cold cargo gas through piping system 62 and cold nitrogen gas through piping system 60. However, a separate header connection and compressor must be provided to deliver the cold gases from separate sources simultaneously.

The present system can also be used to control the boil-off rate of a liquid stored within inner tank 2. To effect this, some of the boil-off is carried through line 70 around line 22 through compressor 7, where it is heated. The heated vapor is then redelivered through header 54 down through open valves 58 and out through piping system 70. The heated vapor when contacting the liquid and gas within tank 2 increases the boil-off rate therein.

The boil-off rate can also be increased by circulating the gas within outer tank space 4 through line 14, line 22, compressor 7, back through header 54 and out through piping system 60. Again with the heated gas returned to the outer tank space 4, the cargo boil-off rate is increased.

Various modifications can be made to the herein disclosed system without departing from the spirit and scope thereof. It should be understood that the types of inert gases and liquids and types of cargo mentioned above are examples only and that the scope of the present invention is not limited thereto.

What is claimed is:

1. A liquefied gas storage tank system having at least one tank having an inner tank wall and a spaced outer tank wall, a supporting structure being spaced from said outer tank wall to define therewith a void space about the outer tank, a system for purging, cooling and warming said tank comprising a delivery header means, valved lines coupled with said header means and each exhausting into one of the inner tank, outer tank space and void space, a return header, a valved line coupled to the return header to selectively bleed gas in the return header out of the system, valved lines coupled to said return header to deliver gas from the inner tank and outer tank space to said return header, a heat exchanger, a desuperheater having its input coupled to the output of said heat exchanger, its output feeding said delivery header means and having its liquid inlet adapted to be coupled to a source of liquefied gas, forcing means for delivering fluid to the input of said heat exchanger, a valved return line coupled from said return header to the input of said forcing means, at least two additional valved lines coupled to the input of said forcing means to selectively deliver air and another fluid thereto.

2. A liquefied gas storage tank system as set forth in claim 1 wherein said delivery header means comprises a first and second header, the input of said first header coupled to the output of said desuperheater, and wherein said lines which deliver gas to said inner tank and outer tank space being coupled to said first header and a line delivering gas to said void space being coupled to the second header, second forcing means having its input coupled through valve means to the input of said first-mentioned forcing means and its output coupled to said second header.

3. A liquefied gas storage tank system as set forth in claim 2 wherein said system further comprises a valved bypass line in parallel with said heat exchanger and a valved line coupled from said first header input to said second header input.

4. A liquefied gas storage tank system as set forth in claim 1 wherein the line feeding gas to the inner tank terminates a first cool-down distribution system having a plurality of horizontal pipes positioned near and extending along respective walls of the inner tank and having nozzles directed toward the adjacent wall, said pipes being arranged and nozzles being spaced so as to direct a substantially uniform blanket of fluid on the adjacent wall, the line feeding gas to said outer wall space terminating in a distribution system including horizontal pipes positioned near and extending along the walls of said outer tank, each said pipe having a plurality of spaced nozzles directed toward the adjacent wall of said outer tank, said pipes being arranged and nozzles being spaced so that a substantially uniform blanket of gas is sprayed on the adjacent tank wall.

5. A method for purging the inner tank, outer tank space, and void space of a liquefied gas storage tank wherein unwanted gases are initially within the tanks and void space, said method comprising discharging relatively warm purified and dehydrated inert flue gas into the void space to displace the gas therein, venting the displaced gas to the atmosphere and when the void space is filled with inert flue gas, locking the inert flue gas therein, at the time of feeding inert flue gas to the void space delivering inert flue gas to the inner tank and outer tank space and displacing the unwanted gases therein, removing the displaced gas through a return header and bleeding the displaced gas in said heater from the system, after the oxygen containing gas is displaced from the inner tank and outer tank space locking the inert flue gas in these tanks.

6. The method of cooling liquefied gas storage tanks having an inner tank, a spaced outer tank and a void space about the outer tank, said method comprising purging the inner tank and outer tank space with an inert gas, displacing the inert gas in the inner tank and outer tank space with warmed cargo gas, thereafter removing the cargo gas from the inner tank and outer tank space, and replacing the removed cargo gas with cooler cargo gas by spraying the same generally uniformly on the walls of said inner and outer tanks.

7. The method of cooling liquefied gas storage tanks set forth in claim 6 wherein the removed gas is cooled and returned to said inner tank and outer tank space.

8. A method as set forth in claim 6 wherein the cargo gas removed from the inner tank and outer tank space is bled from the system and additional colder cargo gas is fed to the inner tank and outer tank space at the same rate that the cargo gas is bled therefrom.

9. A method for cooling double-walled liquefied gas storage tanks initially warmed and filled with an oxygen containing atmosphere, said method comprising displacing the oxygen containing atmosphere in the inner and outer tanks and filling the tanks with nitrogen gas after the tanks are purged, removing the nitrogen gas from the inner tank and outer tank space and feeding cold nitrogen gas into the inner tank and outer tank space by spraying generally uniformly the inner and outer tank walls with said cold nitrogen in order to cool the same.

10. A method for cooling double-walled liquefied gas storage tanks as set forth in claim 9 wherein the inert gas removed from the inner tank and outer tank space is cooled and returned to the inner and outer tank spaces, and wherein the nitrogen removed from the inner tank and outer tank space is cooled by introducing liquid nitrogen into the circulation path of the nitrogen gas before it is returned to the inner tank and outer tank space.

11. The method of warming liquefied gas storage tanks having an inner wall and a spaced outer wall after the liquefied gas has been removed and wherein an atmosphere of cargo gas remains within the inner tank and within the outer tank space, said method comprising removing cargo gas from the inner tank and outer tank space, heating the removed cargo gas and delivering the heated gas back into the inner tank and outer tank space by spraying the same generally uniformly on the inner and outer tank walls.

12. A method of warming liquefied gas storage tanks as set forth in claim 11 further comprising after the inner and outer tanks' temperature has been raised to a predetermined level displacing the cargo gas therein and feeding an inert gas into the inner and outer tank space after only inert gas is present within the inner tank and outer tank space, flushing the same with an oxygen containing atmosphere to displace the inert gases therein, and wherein a void space is provided about the outer tank and is filled with an inert gas, said method further comprising flushing the void space with an oxygen containing atmosphere when flushing the inner tank and outer tank space with the same.

13. The method of controlling the boil-off rate for a liquefied gas body within a storage tank having an inner wall and a spaced outer wall, the inner tank being partially filled with the liquefied gas body and the remainder with an atmosphere of cargo gas and the outer tank space being filled with cargo gas, said method comprising removing a portion of the cargo gas from one of the inner tank and outer tank space, heating the removed cargo gas and feeding the heated cargo gas back to the same of said one of said inner tank and outer tank space.

14. A method for increasing the boil-off rate for a body of liquefied gas within an insulated cargo tank carried by a ship comprising only removing from the tank a portion of the boil-off vapor, heating the same and returning the heated vapor to the same compartment of the tank as the liquid body and thereby heating the liquid body.

References Cited

UNITED STATES PATENTS

| | | | |
|---|---|---|---|
| 2,863,297 | 12/1958 | Johnston | 62—45 |
| 2,916,889 | 12/1959 | Sattler | 62—55 |
| 2,922,287 | 1/1960 | Rae | 62—55 X |
| 2,927,437 | 3/1960 | Rae | 62—55 X |
| 2,940,268 | 6/1960 | Morrison | 62—240 X |
| 2,972,873 | 2/1961 | Peet et al. | 62—55 X |
| 3,110,156 | 11/1963 | Niemann | 62—45 |

FOREIGN PATENTS 1,296,939  5/1962  France.

LLOYD L. KING, *Primary Examiner.*